N. STATHAM.
CALCIUM CARBONATE MANUFACTURE.
APPLICATION FILED DEC. 13, 1915.
1,188,505.
Patented June 27, 1916.
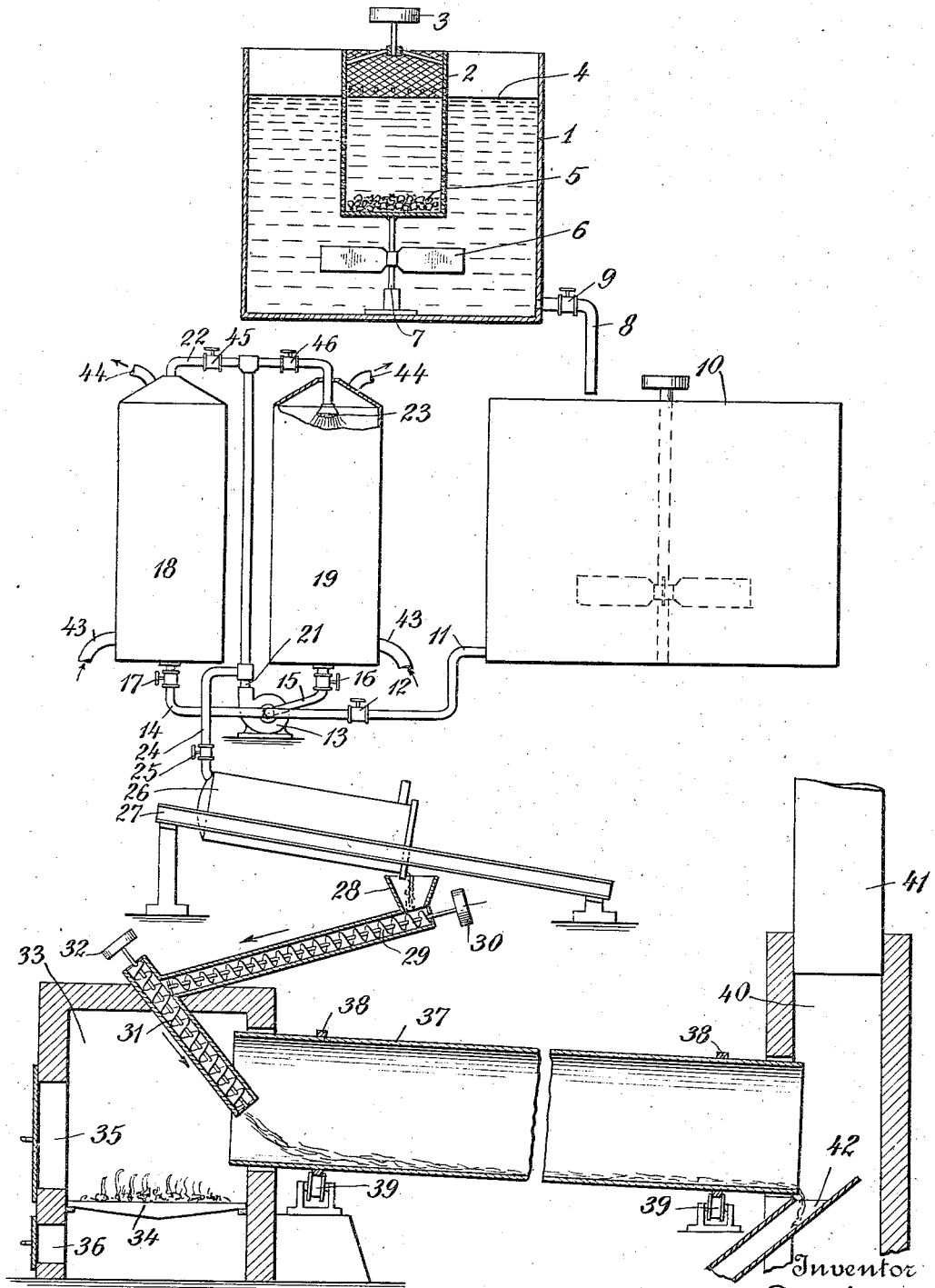
Inventor
Noel Statham
By his Attorney
Harry L. Duncan

UNITED STATES PATENT OFFICE.

NOEL STATHAM, OF BOONTON, NEW JERSEY, ASSIGNOR TO INDUSTRIAL CHEMICAL COMPANY, OF NEW YORK, N. Y., A CORPORATION OF NEW YORK.

CALCIUM-CARBONATE MANUFACTURE.

1,188,505. Specification of Letters Patent. Patented June 27, 1916.

Application filed December 13, 1915. Serial No. 66,464.

*To all whom it may concern:*

Be it known that I, NOEL STATHAM, a subject of the King of Great Britain, and residing at Boonton, Morris county, New Jersey, have made a certain new and useful Invention Relating to Calcium-Carbonate Manufacture, of which the following is a specification, taken in connection with the accompanying drawing, which forms part of the same.

This invention relates especially to the manufacture of calcium carbonate such as whiting or calcium carbonate filler material from the waste lime sludge produced in recausticizing soda for use in the soda pulp process, although other crude calcium carbonate or material may be used to a greater or less extent if desired. The crude calcium carbonate is preferably purified by being suspended in water and passed through a rotary screen of fine mesh through which the lime liquor may pass while particles of clinker or other impurities are retained by the screen, the purified lime liquor being preferably kept agitated to maintain its substantially uniform density and consistency until it is subjected to carbonating action in order to carbonate any hydrated lime which might have been present in the crude material and which would have an injurious action in the finished produce. This may with advantage be effected by passing the lime liquor through suitable carbonating towers down which it may be sprayed by suitable apparatus through an atmosphere containing carbon-dioxid, the material being repeatedly resprayed to the extent desired, and then freed from surplus water by any suitable means as by a filter press. Thereafter the filter cake may be further dried as in a rotary drier and carbonater into which the wet material is preferably fed at the higher end into which the hot gases from a coke or other fire may also enter so as to simultaneously dry and also carbonate the material without overheating the same.

An illustrative form of apparatus for carrying out this process is shown somewhat diagrammatically in the accompanying drawing in which parts are in section, and as shown therein a purifying tank 1 may be provided with a rotary screen 2 mounted on a shaft 7 having a bearing in the bottom of the tank and connected with a pulley or other device 3 by which it may be rotated. This tank may be more or less filled with lime liquor or water containing considerable dissolved or suspended finely divided calcium carbonate together with some calcium hydrate which is converted into hydrate in the later steps of the process, and the waste lime sludge from the recausticizing plant or other suitable form of crude calcium carbonate may be delivered into this rotary screen, together with additional amounts of water to the extent necessary. The screen preferably has an inner or lining screen of very fine mesh so as to retain any larger particles, such as diagrammatically indicated as 5, while the fine calcium carbonate particles are carried through the screen in suspension in the water, and the resulting lime liquor is kept of substantially uniform density by a suitable agitator 6 which may, if desired, be connected with the rotary screen. This lime liquor may be delivered into a storage tank 10 by opening the valve 9 in the discharge pipe 8 connected with the purifying tank, and a discharge pipe 11 from the storage tank is controlled by a valve 12 so as to regulate the amount of this lime liquor which may be taken from time to time into the suction of a suitable centrifugal pump 13 or other circulating device so as to be delivered into one or more carbonating towers connected therewith. Two such towers 18, 19 are shown each provided with a sprayer or disseminator 23 receiving the lime liquor from the pump discharge 21, so that when the valve 46 is open this lime liquor is sprayed down through the carbonating tower 19 which is supplied with lime kiln or other furnace gases or otherwise provided with an atmosphere containing carbon-dioxid as by the gas circulating pipes 43, 44 indicated. The continuous spraying of the lime liquor so as to repeatedly secure this carbonating action in the tower may be effected by opening the valve 16 in the return connection 15 to the pump, so that the lime liquor may be circulated through the tower and therein sprayed and allowed a free fall through the carbonating atmosphere to the extent desired before being delivered to the vacuum or other filter for removal of water therefrom. As indicated the tower 18 may be similarly arranged, the valve 45 controlling the admission of lime liquor to the sprayer pipe 22 adjacent the top of the tower while the valve 17 controls the return pipe 14 leading to the pump suction. If desired a discharge pipe 24 may be arranged in connection with the pump discharge so that when the valve 25 is opened lime liquor may be delivered by the pump to a vacuum filter diagrammatically indicated as 26, 27. Thus after the surplus water has been removed in this way from the calcium carbonate it may be discharged from the filter in the form of relatively dry calcium carbonate cake containing some forty or fifty per cent. or so of water, it being of course understood that it is not necessary in all cases to effect the preliminary carbonating of the liquor referred to before filtering, where the combined drying and carbonating is effected as subsequently described.

This calcium carbonate cake may be dried and simultaneously further carbonated in a rotary drier and carbonator of any suitable construction, such as the inclined rotary drier drum 37 provided with the tires 38 mounted on suitable bearing rolls 39, so that the drum of sheet steel or the like may be readily rotated in a slightly inclined position. Its upper or inlet end may communicate with a furnace or firing chamber 33 having, if desired, a grate 34 and firing and ash openings 35, 36 so that a coke fire may be maintained on the grate to pass the hot gases of combustion containing carbon-dioxid through the rotary drier and carbonator chamber to simultaneously dry and carbonate the material therein. This material may as indicated be delivered to the drier drum by suitable screw conveyers comprising if desired a hopper 28 for receiving the filter cake which may then be discharged by the conveyer 29 operated by the connected pulley 30 into a communicating conveyer 31 operated by another pulley 32. This somewhat wet carbonate material may thus be delivered into the upper end of the drier and carbonator where it is acted upon by the hot gases from the communicating furnace and a considerable portion of the water evaporated and driven off with a corresponding cooling of the furnace gases so that there is relatively little danger of overheating or recausticizing the relatively dry calcium carbonate near the lower discharge end of the drier drum. The agitation of the material which may be effected by the continuous rotation of the drum promotes its contact with the furnace gases therein so that the carbon-dioxid in these gases may readily combine with any calcium hydrate and insure the complete carbonation of the material before its discharge from the lower end of the drum into a discharge chute 42, for instance, which may be mounted in the inclined position indicated in the stack chamber 40 with which a suitable chimney or stack 41 may communicate to carry off the discharge gases. The discharged dry calcium carbonate may of course be further disintegrated if necessary in any suitable apparatus and screened for packaging and sale.

This invention has been described in connection with illustrative apparatus, conditions, materials, proportions, duration and order of steps, to the details of which disclosure the invention is not of course to be limited, since what is claimed as new and what is desired to be secured by Letters Patent is set forth in the appended claims.

1. The process of making calcium carbonate from the waste lime sludge material produced in recausticizing soda for soda pulp manufacture, which comprises purifying the lime sludge material by finely screening the same in the presence of water to form lime liquor free from waste or objectionably large particles, carbonating said lime liquor by spraying the same and effecting its free fall through an atmosphere containing carbon-dioxid furnace gases, removing surplus water from the treated lime liquor by filtration thereof to produce moist calcium carbonate cake, and simultaneously drying and carbonating said calcium carbonate cake while continuously agitating the same in a current of hot furnace gases containing carbon-dioxid and moving in the same general direction as the stream of calcium carbonate material to minimize overheating thereof.

2. The process of making calcium carbonate from the waste lime sludge material produced in recausticizing soda for soda pulp manufacture, which comprises purifying the lime sludge material by finely screening the same in the presence of water to form lime liquor free from objectionably large particles, carbonating said lime liquor by spraying the same and effecting its free fall through an atmosphere containing carbon-dioxid furnace gases, removing surplus water from the treated lime liquor by filtration thereof to produce moist calcium carbonate cake, and simultaneously drying and carbonating said calcium carbonate cake and while continuously agitating the same in a current of hot gases containing carbon-dioxid.

3. The process of making calcium carbonate filler material from waste calcium carbonate material containing calcium hydrate which comprises purifying the calcium carbonate material in the presence of water to form lime liquor free from objectionably large particles, carbonating said lime liquor by exposing the same to carbon-dioxid, removing surplus water from the treated lime liquor to produce calcium carbonate cake, and simultaneously drying and carbonating said calcium carbonate cake in a rotating chamber while continuously agitating the same in a current of hot furnace gases containing carbon-dioxid.

4. The process of making calcium carbonate material from waste calcium carbonate material containing calcium hydrate which comprises purifying the calcium carbonate material in the presence of water to form lime liquor free from objectionably large particles, removing surplus water from the treated lime liquor, and simultaneously drying and carbonating the resulting calcium carbonate in a rotating chamber while continuously agitating the same in a current of hot furnace gases containing carbon-dioxid and moving in the same general direction as the calcium carbonate material to minimize overheating thereof.

5. The process of making calcium carbonate material from waste calcium carbonate material containing calcium hydrate which comprises suspending the calcium carbonate material in water to form lime liquor free from objectionably large particles, removing surplus water from the treated lime liquor, and simultaneously drying and carbonating the resulting calcium carbonate while agitating the same in a current of gases containing carbon-dioxid.

NOEL STATHAM.

Witnesses:
CHAS. A. CASS,
J. WRENCH.